United States Patent
Fang et al.

(10) Patent No.: US 8,055,059 B2
(45) Date of Patent: Nov. 8, 2011

(54) METHOD AND SYSTEM FOR DETERMINING A DEFECT DURING SAMPLE INSPECTION INVOLVING CHARGED PARTICLE BEAM IMAGING

(75) Inventors: Wei Fang, Milpitas, CA (US); Jack Jau, Los Altos Hills, CA (US)

(73) Assignee: Hermes Microvision Inc., Hsinchu (TW)

( * ) Notice: Subject to any disclaimer, the term of this patent is extended or adjusted under 35 U.S.C. 154(b) by 542 days.

(21) Appl. No.: 12/342,821

(22) Filed: Dec. 23, 2008

(65) Prior Publication Data

US 2010/0158317 A1   Jun. 24, 2010

(51) Int. Cl.
*G06K 9/00*   (2006.01)
(52) U.S. Cl. .......... 382/149; 382/106; 382/151
(58) Field of Classification Search .......... 382/106, 382/141–152
See application file for complete search history.

(56) References Cited

U.S. PATENT DOCUMENTS

| | | | | |
|---|---|---|---|---|
| 5,604,819 A * | 2/1997 | Barnard | ......... | 382/151 |
| 5,640,539 A * | 6/1997 | Goishi et al. | ......... | 250/310 |
| 6,952,492 B2 * | 10/2005 | Tanaka et al. | ......... | 382/149 |
| 7,116,816 B2 * | 10/2006 | Tanaka et al. | ......... | 382/149 |
| 7,116,817 B2 * | 10/2006 | Tanaka et al. | ......... | 382/149 |
| 2002/0056808 A1 * | 5/2002 | Tsuneta et al. | ......... | 250/306 |

* cited by examiner

*Primary Examiner* — Patrick J Connolly
(74) *Attorney, Agent, or Firm* — Muncy, Geissler, Olds & Lowe, PLLC

(57) ABSTRACT

A method for determining a defect during sample inspection involving charged particle beam imaging transforms a target charged particle microscopic image and its corresponding reference charged particle microscopic images each into a plurality of feature images, and then compares the feature images against each other. Each feature image captures and stresses a specific feature which is common to both the target and reference images. The feature images produced by the same operator are corresponding to each other. A distance between corresponding feature images is evaluated. Comparison between the target and reference images is made based on the evaluated distances to determine the presence of a defect within the target charged particle microscopic image.

20 Claims, 4 Drawing Sheets

METHOD AND SYSTEM FOR DETERMINING A DEFECT DURING SAMPLE INSPECTION INVOLVING CHARGED PARTICLE BEAM IMAGING

BACKGROUND OF THE INVENTION

1. Field of the Invention

The present invention relates to a method and system for determining abnormities in a dataset, and more particularly to a method and system for determining a defect during sample inspection involving charged particle beam imaging.

2. Description of the Prior Art

Charged particle microscopic images are formed by detecting charged particles released from a sample being bombarded by a charged particle beam. Analyzing the charged particle microscopic images can obtain desired information of the physical and electrical characteristics of the inspected sample. For example, the charged particle beam imaging technique is applied to inspection of semiconductor device, and by analyzing the obtained image of the semiconductor device the presence of defects in the concerned device can be determined.

FIG. 1 illustrates the conventional defect determination method for inspection of a wafer 1 and a plurality of chips arranged on the surface of wafer 1. A method for determining a defect according to a prior art includes comparing an image of corresponding regions 111, 121, 131 within the repeating chips 11, 12, 13, by for example an arithmetic program. If the comparison result gives a signal value which exceeds a predefined threshold, it is determined that there is at least one defect within one of the chips 11, 12, 13. The comparison method of the prior art is based only on a feature gray value for each image of respective regions 111, 121, 131. For example, gray values at different locations within a single image are averaged to produce a global feature gray value for that image. Then, the feature gray values of each image are compared to determine if there is a defect existing within one of the regions 111, 121, and 131. Because the method of the prior art is oversimplified, misjudgment frequently occurs in the inspection. For more precise comparison, more factors should be considered for an image being observed.

According to the foregoing descriptions, a method and system able to more precisely determine the presence of a defect within the charged particle microscopic image and reduce the occurrence of misjudgment is highly desired in the field.

SUMMARY OF THE INVENTION

Embodiments of the present invention are directed to a defect determination method and its application in a charged particle beam inspection system. The disclosed method transforms the charged particle microscopic image of an inspected region into a plurality of feature images wherein each feature images catches and stresses a certain feature therewithin. When multiple images are to be compared to determine the presence of a defect from these concerned images, the feature images stressing the same feature are compared one-by-one or collectively. As a result, more precise determination of the presence of a defect within the charged particle microscopic image is achieved and the occurrence of misjudgment is reduced.

In one embodiment, the proposed method for determining a defect during sample inspection involving charged particle beam imaging comprises providing an image group including a target image, a first reference image and a second reference image of a sample obtained from charged particle beam imaging; transforming the target image into n target feature images using a set of n image transformation operators; transforming the first reference image and the second reference image using the image transformation operators into n first reference feature images and n second reference feature images, respectively; evaluating the distance between the target image and the first reference image according to a distance between each target feature image and the corresponding first reference feature image using a distance evaluation operator such as the single distance evaluation method or different distance evaluation methods or combined, thereby obtaining a first distance; evaluating a distance between the target image and the second reference image according to a distance between each target feature image and the corresponding second reference feature image using the distance evaluation operator thereby obtaining a second distance; and comparing evaluated first and second distances to a predefined threshold distance to determine the presence of the defect within the target image.

In another embodiment, a computer readable medium encoded with a computer program for determining a defect during sample inspection involving charged particle beam imaging is disclosed. The proposed computer program executes actions which comprises causing a charged particle microscopic image source to provide an image group including a target image, a first reference image and a second reference image of the sample obtained from charged particle beam imaging; transforming the target image into n target feature images using a set of n image transformation operators; transforming the first and second reference image using the image transformation operators into n first reference feature images and n second reference feature images, respectively; evaluating a distance between the target image and the first reference image according to a distance between each target feature image and the corresponding first reference feature image using a distance evaluation operator, thereby obtaining a first distance; evaluating a distance between the target image and the second reference image according to a distance between each target feature image and the corresponding second reference feature image using the distance evaluation operator thereby obtaining a second distance; and comparing the evaluated first and second distances to a predefined threshold distance to determine the presence of the defect within the target image.

In yet another embodiment, the proposed charged particle beam inspection system for inspecting a sample comprises a charged particle beam generator, a condenser lens module, a probe forming objective lens module, a charged particle beam deflection module, a secondary charged particle detector module, an image forming module and a defect determination apparatus. The charged particle beam generator is used for generating a primary charged particle beam. The condenser lens module is used for condensing the primary charged particle beam. The probe forming objective lens module is used for focusing the condensed primary charged particle beam into a charged particle beam probe. The charged particle beam deflection module is used for scanning the charged particle beam probe across a surface of the sample. The secondary charged particle detector module is used for detecting charged particles generated from the sample upon being bombarded by the charged particle beam probe to generate a secondary charged particle detection signal. The image forming module is electrically coupled with the secondary charged particle detector module for receiving the secondary charged particle detection signal from the secondary charged particle detector module and forming at least one charged particle microscopic image accordingly. The defect determination apparatus which is encoded with a computer program for determining a defect is electrically coupled with the image forming module, wherein the computer program performs the following steps: retrieving, from the image forming module, an image group including a target image, a first reference image and a second reference image of the sample obtained from charged particle beam imaging; transforming the target image into n target feature images using a set of n image transformation operators; transforming the first and second reference image using the image transformation operators into n first reference feature images and n second reference feature images, respectively; evaluating a distance between the target image and the first reference image according to a distance between each target feature image and the corresponding first reference feature image using a distance evaluation operator thereby obtaining a first distance; evaluating a distance between the target image and the second reference image according to a distance between each target feature image and the corresponding second reference feature image using the distance evaluation operator thereby obtaining a second distance; and comparing the evaluated first and second distances to a predefined threshold distance to determine the presence of the defect within the target image.

The objective, technologies, features and advantages of the present invention will become apparent from the following description in conjunction with the accompanying drawings wherein are set forth, by way of illustration and example, certain embodiments of the present invention.

BRIEF DESCRIPTION OF THE DRAWINGS

The foregoing conceptions and their accompanying advantages of this invention will become more readily appreciated after being better understood by referring to the following detailed description, in conjunction with the accompanying drawings, wherein.

DESCRIPTION OF THE PREFERRED EMBODIMENT

Figure 1:
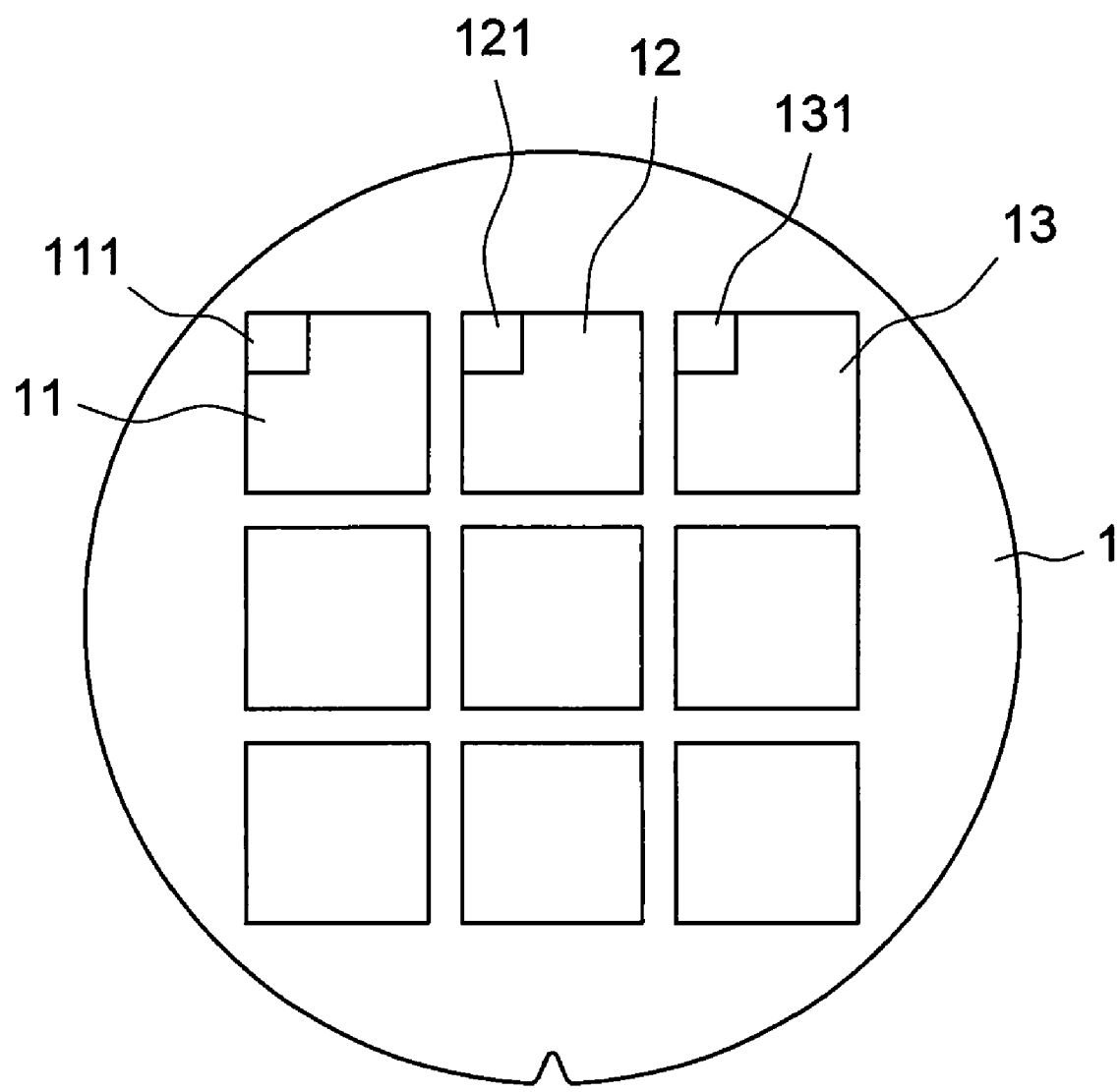
FIG. 1 is a diagram schematically illustrating a method for determining a defect within a charged particle microscopic image according to a prior art.
Figure 2:
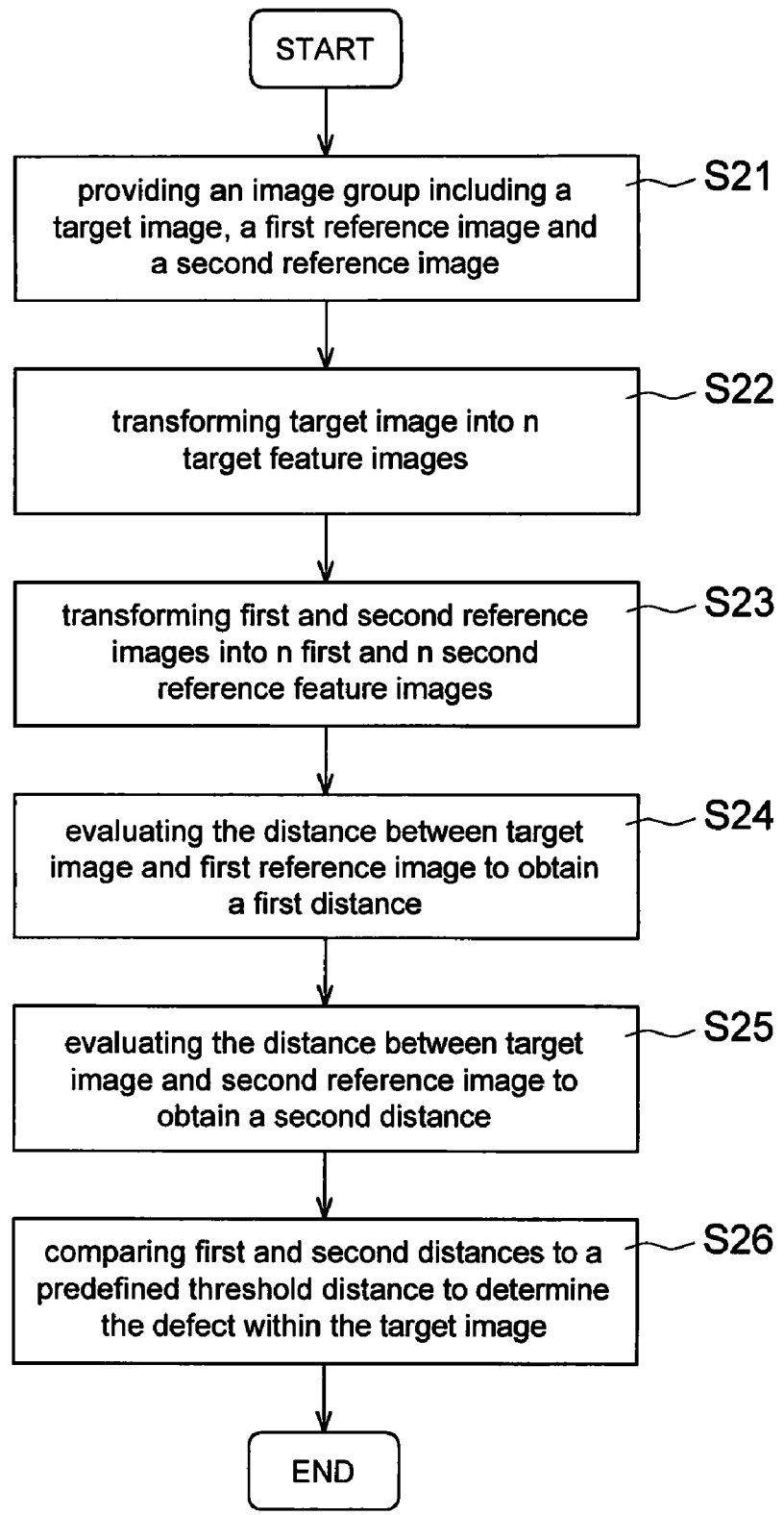
FIG. 2 is a flow chart schematically illustrating a method for determining a defect during sample inspection involving charged particle beam imaging according to an embodiment of the present invention.
Figure 3A:
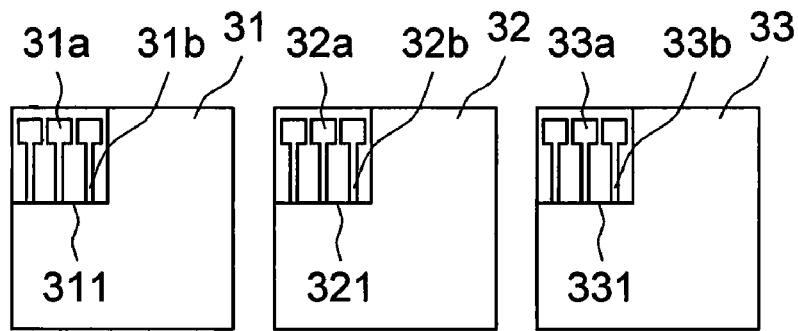
FIG. 3a to FIG. 3c is a diagram schematically illustrating the steps of image transformation shown in FIG. 2 according to an embodiment of the present invention.

FIG. 2 and FIG. 3a to FIG. 3c illustrate a method for determining a defect during sample inspection involving charged particle beam imaging according to an embodiment of the present invention. First, an image group including a target image, a first reference image and a second reference image of a sample obtained from charged particle beam imaging is provided (step S21). For example, chips 31, 32, 33 illustrated in FIG. 3a represent a group of repeating chips with the same patterns and/or processed features, and images 311, 321, 331 are taken from a corresponding region within the chip 31, 32, and 33, therefore can be analyzed together for the purpose of defect determination. To simplify the illustration, the image 311 is designated as a target image including features of conductive pads 31a and traces 31b etc.; the image 321 is designated as a first reference image including features of conductive pads 32a and traces 32b etc.; the image 331 is designated as a second reference image including features of conductive pads 33a and traces 33b etc. It should be noted that images 311, 321, 331 may display the voltage contrast (VC) of the surfaces of the chips 31, 32, 33 and/or the structures underneath the surface.

Figure 3B:
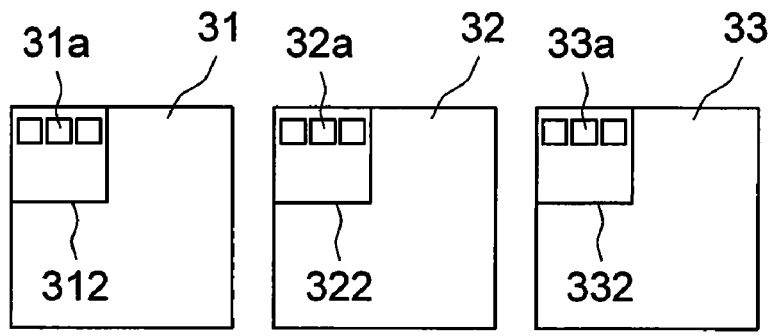
Figure 3C:
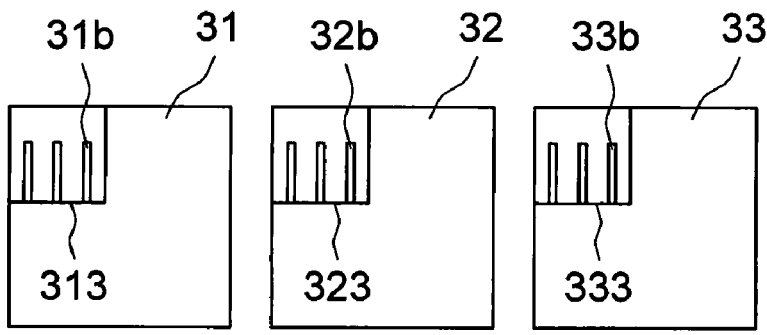

Next, referring to FIG. 2, the target image is transformed into n target feature images using a set of n image transformation operators (step S22). For example, target image 311 is transformed into target feature images 312 and 313 as shown in FIG. 3b and FIG. 3c. As shown, the target feature image 312 captures and stresses the feature of conductive pad 31a within the target image 311, and the target feature image 313 captures and stresses the feature of traces 31b within the target image 311, respectively. In one embodiment, n may be an integer equal to or greater than 2. In addition, the image transformation operators comprise an implementation of one selected from the group consisting of Laplacian filter, Sobel Filter, Distance Map, Gradient Flow Map, other image processing operator or any image frequency operators, or any combination thereof.

The image transformation operators are also applied to transform the first reference image and the second reference image into n first reference feature images and n second reference feature images, respectively (step S23). For example, as also shown in FIGS. 3b and 3c, the first reference image 321 is transformed into first reference feature images 322, 323, wherein the first reference feature image 322 captures and stresses the feature of conductive pad 32a within the first reference image 321 and the first reference feature image 323 captures and stresses the feature of traces 32b within the first reference image 321. Similarly, the second reference image 331 is transformed into second reference feature images 332, 333, wherein the second reference feature image 332 captures and stresses the feature of conductive pad 33a within the second reference image 331 and the second reference feature image 333 captures and stresses the feature of traces 33b within the second reference image 331. It is noted that the first and second reference feature images 322 and 332 are corresponding to the target feature image 312 as these two reference feature images are produced by the same transformation operator used to produce the target feature image 312. As a result, in the following steps the target feature image 312 will be analyzed together with the first and second reference feature images 322 and 332 in the following steps. Similarly, the first and second reference feature images 323 and 333 are corresponding to the target feature image 313 as all of the three images are produced by the same operator. Therefore, the target feature image 313 will be analyzed together with the first and second reference feature images 323 and 333 in the following steps.

Next, a distance between the target image and the first reference image is evaluated according to a distance between each target feature image and the corresponding first reference feature image using a distance evaluation operator to obtain a first distance (step S24). For example, the first distance is evaluated from the distance between the target feature image 312 and the first reference feature image 322 and the distance between the target feature image 313 and the first reference feature image 323. In one embodiment, the distance evaluation operator comprises an implementation of one selected from the group consisting of Euclidean distance function, Manhattan distance function, or any combination thereof.

Similarly, a distance between the target image and the second reference image is evaluated according to a distance between each target feature image and the corresponding second reference feature image using the distance evaluation operator to obtain a second distance (step S25). For example, the second distance is evaluated from the distance between the target feature image 312 and the second reference feature image 332 and the distance between the target feature image 313 and the second reference feature image 333. Similarly, the distance evaluation operator comprises an implementation of one selected from the group consisting of Euclidean distance function, Manhattan distance function, or any combination thereof.

Finally, the evaluated first and second distance are compared against a predefined threshold distance to determine the presence of a defect within the target image 311 (step S26). For example, if both the first distance and the second distance are equal to or greater than the threshold distance, it is determined that there is at least one defect within the target image, otherwise it is determined that there is no defect within the target image.

In one embodiment, the method further includes providing the next image group and the same determination process as described above is performed for a designated target image within this provided next image group. It should be noted that steps S22 to S26 may be selectively performed during or prior to the step of providing the next image group.

The disclosed method for determining defect may be implemented by pure software. For example, the method may be stored in a computer program encoded on a computer readable medium. The computing unit of a charged particle inspection system such as a scanning electron microscope (SEM) reads the program encoded on the computer readable medium to perform the defect determination method according to the present invention. In addition, as will be obvious to those skilled in the art, the disclosed method can also be implemented by pure hardware, pure firmware, or any combination of software, hardware and firmware.

Figure 4:
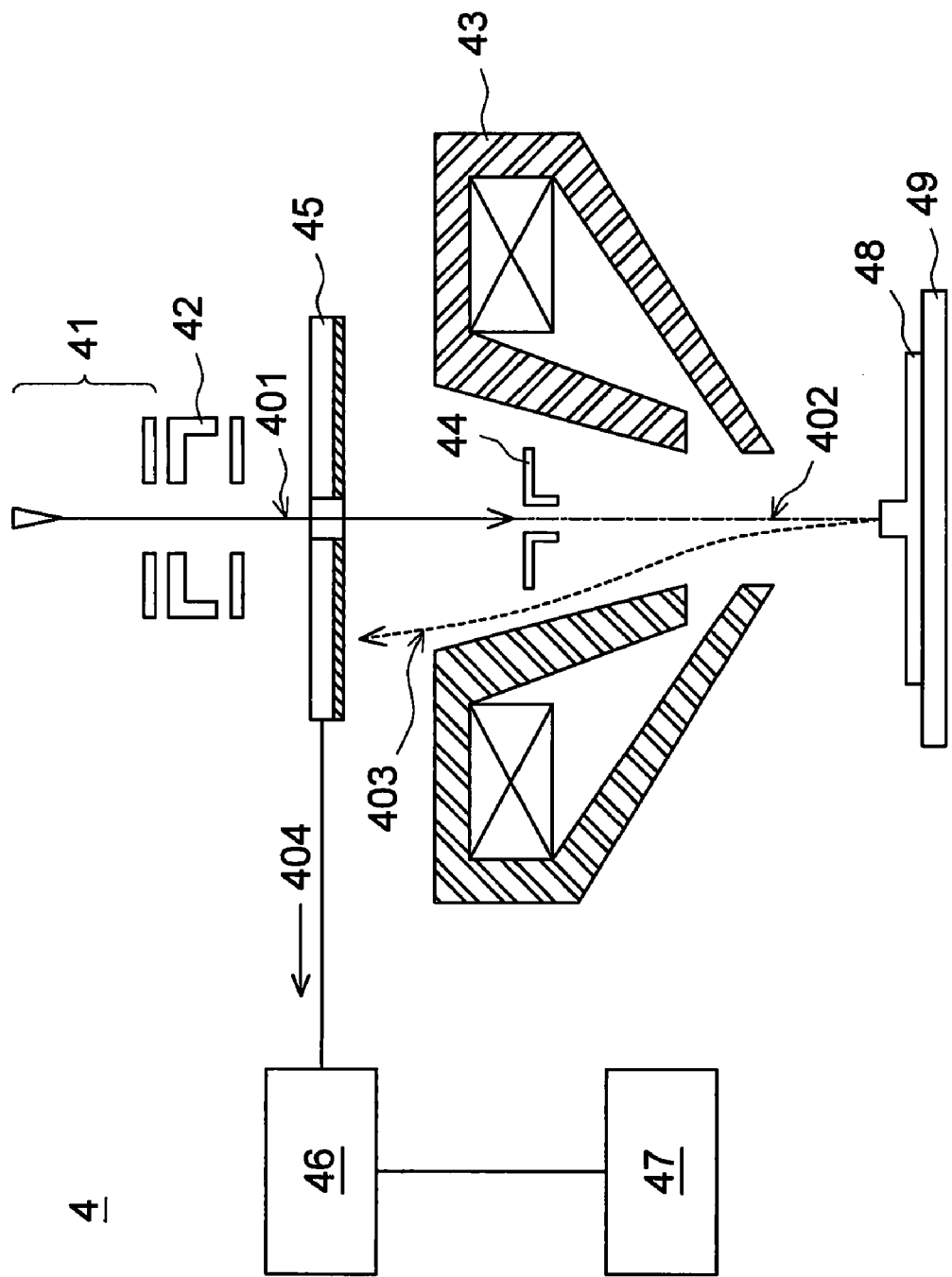
FIG. 4 is a diagram schematically illustrating a charged particle beam inspection system according to an embodiment of the present invention.

Referring to FIG. 4, which illustrates a charged particle beam inspection system 4 according to an embodiment of the present invention. The charged particle beam inspection system 4 is for inspecting a sample 48 on a sample stage 49 and comprises a charged particle beam generator 41, a condenser lens module 42, a probe forming objective lens module 43, a charged particle beam deflection module 44, a secondary charged particle detector module 45, an image forming module 46 and a defect determination apparatus 47. The charged particle beam generator 41 is used for generating a primary charged particle beam 401. The condenser lens module 42 is used for condensing the generated primary charged particle beam. The probe forming objective lens module 43 is used for focusing the condensed primary charged particle beam into a charged particle beam probe 402. The charged particle beam deflection module 44 is used for scanning the charged particle beam probe 402 across a surface of the sample 48 secured on the sample stage 49.

According to the above description, the secondary charged particle detector module 45 is used for detecting charged particles 403 generated from the sample (may also be along with other reflected or scattered charged particles from the sample surface) upon being bombarded by the charged particle beam probe 402 to generate a secondary charged particle detection signal 404. The image forming module 46 is electrically coupled with the secondary charged particle detector module 45 for receiving the secondary charged particle detection signal 404 from the secondary charged particle detector module 45 and forming at least one charged particle microscopic image accordingly. The defect determination apparatus 47 is electrically coupled with the image forming module 46 to determine the presence of a defect within the charged particle microscopic images received from the image forming module 46. In one embodiment, a computer program for determining the defect is encoded within the defect determination apparatus 47 so that the defect determination apparatus 47 is able to perform the steps of defect determination illustrated in FIG. 2.

To summarize the foregoing descriptions, a method and its applications for determining a defect during sample inspection involving charged particle beam imaging have been disclosed in accordance with embodiments of the present invention. A charged particle beam inspection system capable of performing the disclosed method transforms a charged particle microscopic image of corresponding regions on a sample into a plurality of feature images which respectively captures and stresses certain specific processed feature within the region being inspected, and then compares these feature images to determine the presence of defects in the regions being inspected. For example, the difference in the gray level between individual feature images can be represented by (mathematically-defined) distance length and considered. As a result, the presence of defects is determined according to multiple indices, as compared to the single parameter method (for example each image is represented by a single average gray level value for comparison) of the conventional art. Therefore, it is possible to more precisely determine the presence of a defect from a charged particle microscopic image of a sample and reduce the occurrence of misjudgment. It is noted that in transforming the original image of a region being inspected into a feature image, the image transformation operator to be used is selected based on the specific feature within the inspected region that is intended to be captured and stressed. For example, one operator may be used to capture and stress a conductive pad and another to capture and stress a trace or a connecting wire. As a result, individual formed feature image is produced to evaluate the inspected region from a different view angle. The inspected region is analyzed according to different processed features stressed in the form of, for example, voltage contrast gray level. Therefore, the purpose of multi-dimensional determination of defect of the embodiments of the present invention can be achieved.

While the invention is susceptible to various modifications and alternative forms, a specific example thereof has been shown in the drawings and is herein described in detail. It should be understood, however, that the invention is not to be limited to the particular form disclosed, but to the contrary, the invention is to cover all modifications, equivalents, and alternatives falling within the spirit and scope of the appended claims.

What is claimed is:

1. A method for determining a defect during sample inspection involving charged particle beam imaging, comprising:

providing an image group including a target image, a first reference image and a second reference image of a sample obtained from charged particle beam imaging;

transforming said target image into a plurality n of target feature images using a set of n image transformation operators;

transforming said first reference image and said second reference image using said image transformation operators into n first reference feature images and n second reference feature images, respectively;

evaluating a distance between said target image and said first reference image according to a distance between each said target feature image and corresponding said first reference feature image using a distance evaluation operator to obtain a first distance;

evaluating a distance between said target image and said
second reference image according to a distance between
each said target feature image and corresponding said
second reference feature image using said distance
evaluation operator to obtain a second distance; and comparing said evaluated first and second distances to a
predefined threshold distance to determine a presence of
said defect within said target image.

2. The method of claim 1, wherein if both said first and
second distances are equal to or greater than said threshold
distance, then it is determined that there is at least one defect
within said target image, otherwise it is determined that there
is no defect within said target image.

3. The method of claim 1, wherein n is an integer equal to
or greater than 2.

4. The method of claim 1, further comprising a step of
providing a next image group, wherein the steps of transforming
images, evaluating distances and comparing evaluated
distances with said threshold distance are selectively performed
during or prior to the step of providing the next image
group.

5. The method of claim 1, wherein said image transformation
operators comprise an implementation of one selected
from the group consisting of Laplacian filter, Sobel Filter,
Distance Map, Gradient Flow Map, other image processing
operator or any image frequency operators, or any combination
thereof.

6. The method of claim 1, wherein said distance evaluation
operator comprises an implementation of one selected from
the group consisting of Euclidean distance function, Manhattan
distance function, or any combination thereof.

7. A computer readable medium encoded with a computer
program for determining a defect during sample inspection
involving charged particle beam imaging, comprising:

causing a charged particle microscopic image source to
provide an image group including a target image, a first
reference image and a second reference image of said
sample obtained from charged particle beam imaging;

transforming said target image into n target feature images
using a set of n image transformation operators;

transforming said first reference image and said second
reference image using said image transformation operators
into n first reference feature images and n second
reference feature images, respectively;

evaluating a distance between said target image and said
first reference image according to a distance between
each said target feature image and corresponding said
first reference feature image using a distance evaluation
operator to obtain a first distance;

evaluating a distance between said target image and said
second reference image according to a distance between
each said target feature image and corresponding said
second reference feature image using said distance
evaluation operator to obtain a second distance; and comparing said evaluated first and second distances to a
predefined threshold distance as to determine the presence
of said defect within said target image.

8. The computer readable medium of claim 7, wherein if
both said first and second distances are equal to or greater than
said threshold distance, then it is determined that there is at
least one defect within said target image, otherwise it is determined
that there is no defect within said target image.

9. The computer readable medium of claim 7, wherein said
image transformation operators are selected such that each
said target feature image and its corresponding reference
feature images capture and stress a predetermined processed
feature which is common to all said target image and reference
images.

10. The computer readable medium of claim 7, wherein n is
an integer equal to or greater than 2.

11. The computer readable medium of claim 7, further
comprising a step of causing said charged particle microscopic
image source to provide a next image group.

12. The computer readable medium of claim 11, wherein
the steps of transforming images, evaluating distances and
comparing evaluated distances with said threshold distance
are selectively performed during or prior to the step of causing
said charged particle microscopic image source to provide
the next image group.

13. The computer readable medium of claim 7, wherein
said image transformation operators comprise an implementation
of one selected from the group consisting of Laplacian
filter, Sobel Filter, Distance Map, Gradient Flow Map, other
image processing operator or any image frequency operators,
or any combination thereof.

14. The computer readable medium of claim 7, wherein
said distance evaluation operator comprises an implementation
of one selected from the group consisting of Euclidean
distance function, Manhattan distance function, or any combination
thereof.

15. A charged particle beam inspection system for inspecting
a sample comprising:

a charged particle beam generator for generating a primary
charged particle beam;

a condenser lens module for condensing said primary
charged particle beam;

a probe forming objective lens module for focusing said
condensed primary charged particle beam into a charged
particle beam probe;

a charged particle beam deflection module for scanning
said charged particle beam probe across a surface of said
sample;

a secondary charged particle detector module for detecting
charged particles generated from said sample when
being bombarded by said charged particle beam probe
and generating a secondary charged particle detection
signal accordingly;

an image forming module electrically coupled with said
secondary charged particle detector module for receiving
said secondary charged particle detection signal
from said secondary charged particle detector module
and forming at least one charged particle microscopic
image accordingly; and a defect determination apparatus encoded with a computer
program for determining a defect, said defect determination
apparatus being electrically coupled with said
image forming module, wherein said computer program
performs the following steps:

retrieving, from said image forming module, an image
group including a target image, a first reference image
and a second reference image of said sample obtained
from charged particle beam imaging;

transforming said target image into n target feature
images using a set of n image transformation operators;

transforming said first reference image and said second
reference image using said image transformation
operators into n first reference feature images and n
second reference feature images, respectively;

evaluating a distance between said target image and said
first reference image according to a distance between
each said target feature image and corresponding said first reference feature image using a distance evaluation operator to obtain a first distance;

evaluating a distance between said target image and said second reference image according to a distance between each said target feature image and corresponding said second reference feature image using said distance evaluation operator to obtain a second distance; and comparing said evaluated first and second distances to a predefined threshold distance to determine a presence of said defect within said target image.

16. The charged particle beam inspection system of claim 15, wherein if both said first and second distances are equal to or greater than said threshold distance, then it is determined that there is at least one defect within said target image, otherwise it is determined that there is no defect within said target image.

17. The charged particle beam inspection system of claim 15, wherein n is an integer equal to or greater than 2.

18. The charged particle beam inspection system of claim 15, said computer program further comprising retrieving a next image group from said image forming module, wherein the steps of transforming images, evaluating distances and comparing evaluated distances with said threshold distance are selectively performed during or prior to the step of retrieving the next image group from said image forming module.

19. The charged particle beam inspection system of claim 15, wherein said image transformation operators comprise an implementation of one selected from the group consisting of Laplacian filter, Sobel Filter, Distance Map, Gradient Flow Map, other image processing operator or any image frequency operators, or any combination thereof.

20. The charged particle beam inspection system of claim 15, wherein said distance evaluation operator comprises an implementation of one selected from the group consisting of Euclidean distance function, Manhattan distance function, or any combination thereof.

* * * * *